(12) United States Patent
Bachu et al.

(10) Patent No.: US 9,288,732 B2
(45) Date of Patent: Mar. 15, 2016

(54) METHOD AND APPARATUS FOR UTILITY BASED INTERFERENCE MANAGEMENT

(71) Applicant: QUALCOMM Incorporated, San Diego, CA (US)

(72) Inventors: Raja Sekhar Bachu, Kendall Park, NJ (US); Prashanth Haridas Hande, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 14/031,986

(22) Filed: Sep. 19, 2013

(65) Prior Publication Data

US 2015/0078343 A1     Mar. 19, 2015

(51) Int. Cl.
*H04W 36/20* (2009.01)
*H04W 52/24* (2009.01)
*H04W 24/02* (2009.01)
*H04L 1/00* (2006.01)
*H04W 24/10* (2009.01)

(52) U.S. Cl.
CPC .............. *H04W 36/20* (2013.01); *H04L 1/00* (2013.01); *H04W 24/02* (2013.01); *H04W 52/243* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 2008/0233967 A1* | 9/2008 | Montojo et al. | 455/452.2 |
| 2010/0203882 A1* | 8/2010 | Frenger et al. | 455/423 |
| 2011/0249566 A1* | 10/2011 | Bergman et al. | 370/241 |
| 2012/0046063 A1 | 2/2012 | Chande et al. | |
| 2012/0184206 A1 | 7/2012 | Kim et al. | |
| 2013/0005269 A1 | 1/2013 | Lindoff et al. | |
| 2013/0039253 A1 | 2/2013 | Takano | |
| 2013/0337800 A1* | 12/2013 | Gormley et al. | 455/423 |

OTHER PUBLICATIONS

3GPP (Apr. 2011). Draft 3GPP TR 36.922 v10.0.0. 3rd Generation Partnership Project; Technical Specification Group Radio Access Network; Evolved Universal Terrestrial Radio Access (E-UTRA); TDD Home eNode B (HeNB) Radio Frequency (RF) requirements.
Hande P., et al., "Distributed Uplink Power Control for Optimal SIR Assignment in Cellular Data Networks", INFOCOM 2006. 25th IEEE International Conference on Computer Communications. Proceedings, IEEE, Piscataway, NJ, Apr. 1, 2006, pp. 1-13, XP031072288, DOI: 10.1109/INFOCOM.2006.248, ISBN: 978-1-4244-0221-2, abstract p. 1, left-hand column, line 1; p. 2, left-hand column, line 16; p. 2, left-hand column, line 40; p. 9, left-hand column, line 14; p. 9, right-hand column, line 38; p. 12, right-hand column, line 20 (13 pages).

(Continued)

*Primary Examiner* — Alex Skripnikov
(74) *Attorney, Agent, or Firm* — Arent Fox LLP

(57) ABSTRACT

The present disclosure presents a method and apparatus for managing uplink (UL) interference at a base station. For example, the method may include receiving one or more reselection or handover measurements from one or more user equipments (UEs) in communication with the base station and receiving one or more load indicator values from one or more neighboring base stations of the base station. Furthermore, such an example method may include estimating an interference target value for the one or more UEs in communication with the base station based at least on the measurements received from the one or more UEs and the load indicator values received from the one or more neighboring base stations. As such, the uplink interference at a base station may be managed.

32 Claims, 9 Drawing Sheets

(56) References Cited

OTHER PUBLICATIONS

International Search Report and Written Opinion—PCT/US2014/051982—ISA/EPO—Feb. 3, 2015 (13 pages).
Nokia Siemens Networks: "Considerations on the SIR target settings in Multiflow", 3GPP Draft; R1-131601 Considerations on the SIR Target Settings in Multiflow, 3rd Generation Partnership Project (3GPP), Mobile Competence Centre; 650, Route Des Lucioles; F-0621 Sophia-Antipolis C, vol. RAN WG1, no. Chicago, U.S.A.; 20130409-20130415, Apr. 6, 2013, XP050697379, Retrieved from the Internet: URL: http://www.3gpp.org/ftp/tsg_ran/WG1_RL1/TSGR1_72b/Docs/ [retrieved on Arp. 6, 2013] paragraphs 1 to 2.2 (3 pages).
Nurminen H., et al., "Statistical path loss parameter estimation and positioning using RSS measurements", Ubiquitous Positioning, Indoor Navigation, and Location Based Services (UPINLBS), Oct. 3, 2012, pp. 1-8, XP032307928, 8 Pages, DOI: 10.1109/UPINLBS.2012.6409754, ISBN: 978-1-4673-1908-9 abstract p. 1, right hand column, line 29; p. 4, left-hand column, line 34; p. 7, left-hand column, line 8; p. 8, left-hand column, line 12 (8 pages).
Picochip Designs: "HeNB to macro eNB cochannel interference simulations- uplink", 3GPP Draft; R4-092712 Uplink HeNB ENB Interference, 3rd Generation Partnership Project (3GPP), Mobile Competence Centre; 650, Route Des Lucioles; F-06921 Sophia-Antipolis Cedex; France, no. Shenzhen, China; Aug. 17, 2009, XP050353911, [retrieved on Aug. 17, 2009] paragraphs 3.1 to 5 (20 pages).
Picochip Designs: "Text Proposal for 36.9xx Control of HeNB Uplink Interference", 3GPP Draft; R4-093670 Uplink TP, 3rd Generation Partnership Project (3GPP), Mobile Competence Centre; 650, Route Des Lucioles; F-06921 Sophia-Antipolis Cedex; France, no. Miyazaki; Oct. 12, 2009, XP050393281,[retrieved on Oct. 6, 2009] paragraph 2 (7 pages).
Foschini G.J., et al., "A Simple Distributed Autonomous Power Control Algorithm and its Convergence", IEEE Transactions on Vehicular Technology, Nov. 1993, vol. 42, No. 4, pp. 641-646.
Huang J., et al., "Distributed Interference Compensation for Wireless Networks", IEEE Journal on Selected Areas in Communications, May 2006, vol. 24, No. 5, pp. 1074-1084.
Xiao M., et al., "A Utility-Based Power-Control Scheme in Wireless Cellular Systems", IEEE/ACM Transactions on Networking, Apr. 2003, vol. 11, No. 2, pp. 210-221.
Yates R.D., "A Framework for Uplink Power Control in Cellular Radio Systems", IEEE Journal on Selected Areas in Communications, Sep. 1995, vol. 13, No. 7, pp. 1341-1347.

* cited by examiner

METHOD AND APPARATUS FOR UTILITY BASED INTERFERENCE MANAGEMENT

BACKGROUND

1. Field

Aspects of the present disclosure relate generally to wireless communications, and more particularly to managing interference in wireless networks.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third, generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

To supplement conventional base stations, low power base stations, for example, femto cells, pico cells, etc. can be deployed to provide more robust wireless coverage to mobile devices. As deployment of such base stations is unplanned, such low power base stations can interfere with communications of other base stations and/or UEs when base stations are deployed within a close vicinity of one another. Such interference can result in poor network performance and/or stability, for example, low up link (UL) rate for user equipment (UE).

For example, uplink interference and/or network performance are typically managed by controlling the UL rates of UEs. The existing approaches monitor the rise over thermal (ROT) parameters to make decisions about the UL rate control at the UE. ROT is the ratio of the received signal power to the thermal noise, and generally a reliable indicator of overall interference level and the system stability for macro networks that have geometric regularity and support handoffs. However, uplink interference control algorithms generally tailored for macro cells may yield less than desired network performance when small cells, for example, femtocells, pico cells, etc. are introduced into the network along macro cells as some of the geometric regularity and handoff assumptions are no longer valid.

Uplink power control mechanisms generally balance user quality of service (QoS) against interference caused to other links. The existing utility based uplink interference management and/or power control algorithms may require exchanging of information between base stations either directly or through the user equipment (UEs). However, the proposed mechanisms do not define the information to be exchanged and/or and how it must be used. As such, a mechanism for managing interference at a base station by defining information to be exchanged and how it is used may be desired.

SUMMARY

The following presents a simplified summary of one or more aspects in order to provide a basic understanding of such aspects. This summary is not an extensive overview of all contemplated aspects, and is intended to neither identify key or critical elements of all aspects not delineate the scope of any or all aspects. Its sole purpose is to present some concepts of one or more aspects in a simplified form as a prelude to the more detailed description that is presented later.

The present disclosure presents an example method and apparatus for managing uplink (UL) interference at a base station. In an aspect, a method for managing uplink (UL) interference at a base station is described. The method may include receiving one or more reselection or handover measurements from one or more user equipments (UEs) in communication with the base station, receiving one or more load indicator values from one or more neighboring base stations of the base station, and estimating an interference target value for the one or more UEs in communication with the base station based at least on the measurements received from the one or more UEs and the load indicator values received from the one or more neighboring base stations.

In an additional aspect, an apparatus for managing uplink (UL) interference is described. The apparatus may include means for receiving one or more reselection or handover measurements from one or more user equipments (UEs) in communication with the base station, means for receiving one or more load indicator values from one or more neighboring base stations of the base station, and means for estimating an interference target value for the one or more UEs in communication with the base station based at least on the measurements received from the one or more UEs and the load indicator values received from the one or more neighboring base stations.

Moreover, the present disclosure presents a computer program product for managing uplink (UL) interference. The computer program product may include a computer-readable medium comprising code for receiving one or more reselection or handover measurements from one or more user equipments (UEs) in communication with the base station, receiving one or more load indicator values from one or more neighboring base stations of the base station, and estimating an interference target value for the one or more UEs in communication with the base station based at least on the measurements received from the one or more UEs and the load indicator values received from the one or more neighboring base stations.

In a further aspect, an apparatus for managing uplink (UL) interference at a base station is described. The apparatus may include a reselection or handover measurements receiving component to receive one or more reselection or handover measurements from one or more user equipments (UEs) in communication with the base station, a load indicator value receiving component to receive one or more load indicator values from one or more neighboring base stations of the base station, and an interference target value estimating component to estimate an interference target value for the one or more UEs in communication with the base station based at least on the measurements received from the one or more UEs and the load indicator values received from the one or more neighboring base stations.

To the accomplishment of the foregoing and related ends, the one or more aspects comprise the features hereinafter fully described, and particularly pointed out in the claims. The following description and the annexed drawings set forth in detail certain illustrative features of the one or more aspects. These features are indicative, however, of but a few of the various ways in which the principles of various aspects may be employed, and this description is intended, to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details, in some instances, well known structures and components are shown in block diagram form in order to avoid obscuring such concepts.

The present disclosure provides a method and apparatus for managing uplink (UL) interference at a base station, that comprises receiving one or more reselection or handover measurements from one or more user equipments (UEs) in communication with the base station, receiving one or more load indicator values from one or more neighboring base stations of the base station, and estimating an interference target value for the one or more UEs in communication with the base station based at least on the measurements received from the one or more UEs and the load indicator values received from the one or more neighboring base stations.

Figure 1:
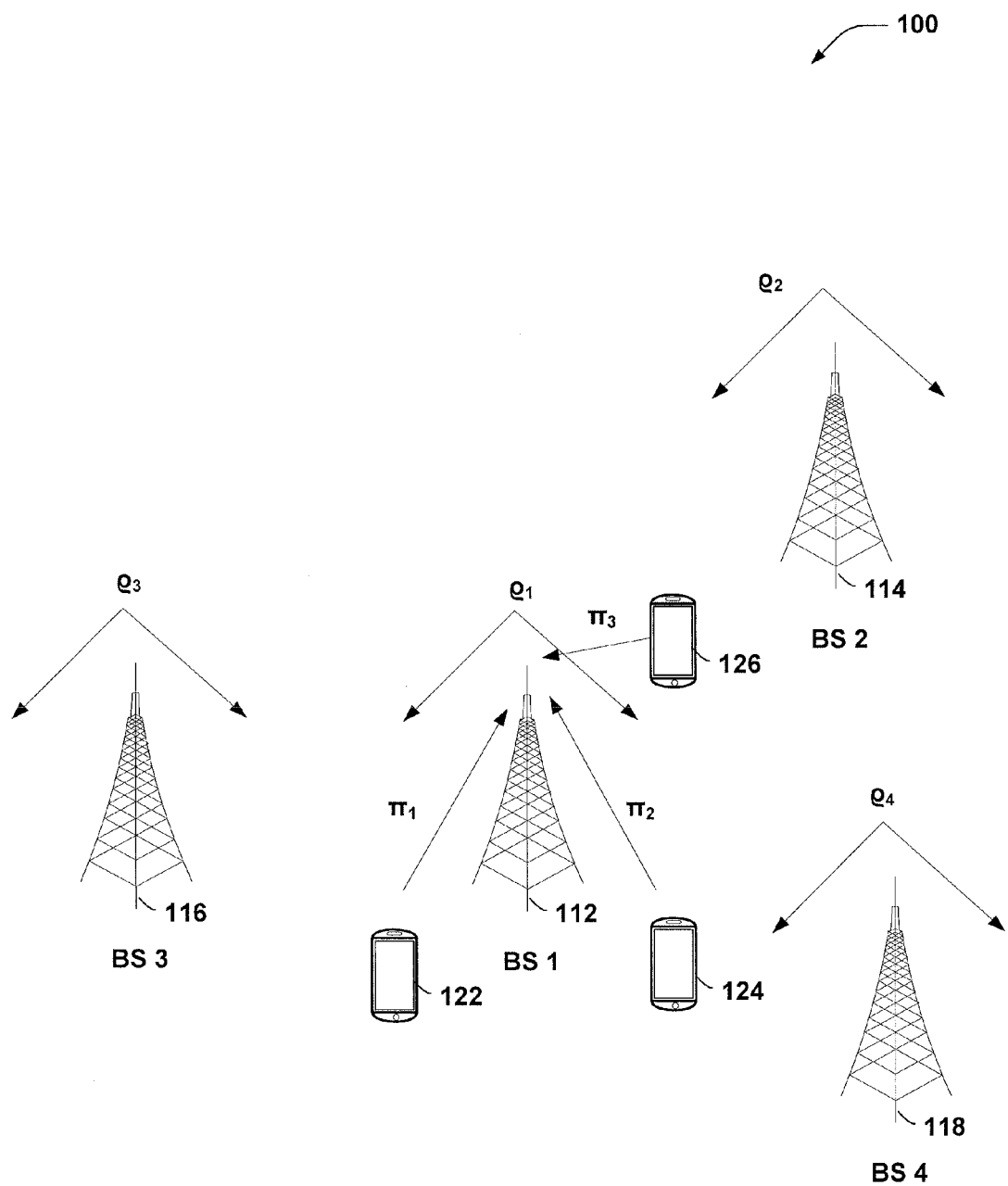
FIG. 1 is a block diagram of an example wireless communication system of aspects of the present disclosure.

Referring to FIG. 1, a wireless communication system 100 is illustrated that facilitates managing uplink (UL) interference at a base station in heterogeneous networks. System 100 includes a plurality of base stations, for example, 112, 114, 116, and/or 118. Base stations 112, 114, 116, and 118 may be macro cells, femtocells, pico cells, or any high-powered or low-powered base stations and may operate according to any radio access technology (RAT) standard, for example, W-CDMA or LTE.

In an aspect, system 100 includes user equipments (UEs) 122, 124, and/or 126 which may be in communication with one or more base stations. For example, in an aspect, UEs 122, 124, and 126 may be in communication with base station 112. In an additional aspect, UE 122 may be camped on base station 112 and base station 112 may be considered as the serving base station of UE 122. Although, a UE may be camped on a base station, for example, UE 122 camped on base station 112, the UE may simultaneously make measurements of neighboring base stations in the vicinity of UE 122. For example, UE 122 may additionally make measurements on neighboring base station 116 and 118. In an aspect, however, uplink communications from a UE with a base station may interfere with uplink communications from other UEs either in the same base station or in the neighboring base stations. For example, communications from UE 122 to base station 112 may interfere with of UEs 124 and/or 126 with base station 112.

In an aspect, in system 100, signal to interference plus noise ratio (SINR) target of a link, for example, link 'i' between UE 122 and base station 112, may be calculated using power control measurements. For example, in an aspect, SINR target, $\gamma(t,i)$ of link 'i', may be calculated as shown below:

$$p_i(k+1) = \frac{p_i(k)}{\gamma_i}\gamma_{t,i}$$

where $p_i(k)$ may be the transmit power of link 'i' at power control interval 'k' and $\gamma_i$ is current SINR of link 'i'. In an aspect, SINR target values may be chosen to balance system stability and usage. However, the selection of an infeasible target SINR value, for example, a higher target value, may result in divergence of UE transmit powers resulting in system instability. Additionally, as the interference environment may continually change due to the movement of the UEs in system 100, the selection of an infeasible target SINR value may further deteriorate system stability.

In an aspect, the stability of system 100 may be managed by measuring Rise over Thermal (RoT) at the receivers of the base stations, for example, at receivers of base stations 112, 114, 116, and/or 118, and keeping the SINR target values within an acceptable threshold value. For example, when RoT increases because of inter cell interference, i.e., interference from a cell on its neighboring cells or vice versa, data rates of elastic rate users, users with fluctuating data rates, may be throttled. In an additional aspect, if the throttling of elastic rate users does not reduce RoT within an acceptable threshold value, Quality of Service (QoS) requirements for non-elastic data rate users may be stepped down. For example, voice users may be moved to lower vocoder rates to manage RoT within an acceptable threshold value. In an additional aspect, if moving the voice users to lower vocoder rates does not reduce the RoT to an acceptable threshold value, QoS users may be either handed over or dropped in priority order.

In an aspect, a conservative RoT threshold value, for example, a RoT threshold value on the lower end, may be chosen to improve system stability. But, the selection of a lower end RoT value may lead to underutilization of system capacity. The network operators may not be in favor of underutilizing their networks, as the network operators have huge financial investments in their networks and they would prefer to use the networks to their capacity to maximize returns. Further, as the goal of interference management is to manage interference and maintain system stability while maximizing system utilization, the approached described below further addresses the problems described above.

In an aspect of an utility based framework, interference may be managed while maintaining system stability. For example, a cost function of a link, for example, a communication link between a UE and base station, may be associated with transmit power of a transmitter of a link and the soft SINR target value may be chosen to maximize the current net utility/surplus which may be measured, for example, using the formula shown below:

$$s_i = u_i(\gamma_i) - c_i(p_i)$$

The SINR γi of link 'i' may be calculated, for example, as shown below:

$$\gamma_i = \frac{h_{ii} p_i}{\sum_{k \neq i} p_j h_{ik} + \eta_i} = \frac{h_{ii} p_i}{r_i}$$

where $h_{ik}$ is channel gain from transmitter of 'i'th link to the receiver of 'k'th link. In an example aspect, 'i'th link may be between transmitter of UE 122 and receiver of base station 112, and 'k'th link may be between UE 124 and receiver of base station 112. In an aspect, for example, a heuristic function that may adapt to the transmission environment of system 100 may be shown by:

$$c_i(p_i) = \alpha r_i p_i$$

In an aspect, based on the above cost function described for link 'i', soft SINR target for link 'i' may be calculated as shown below:

$$\gamma_{t,i} = g_i\left(\frac{\alpha r_i^2}{h_{ii}}\right)$$
$$= g_i\left(\frac{p_i}{\gamma_i} \alpha r_i\right)$$

where $g_i(\ )$ is an inverse of marginal utility of link 'i'.

In an additional aspect, a distributed interference management algorithm may maximize the net utility/surplus function, for example, as shown below:

$$s_i = u_i(\gamma_i) - \sum_k c_{ki} + c_{ii}$$

However, the cost per link may be replaced by cost per base station by adding cost of all the links served by a base station $$\rho_k = \sum_{k \text{ is serving base station of link } j} \pi_j$$

In an aspect, for example, cost of links between UEs 122, 124, and 126 and base station 112, may be replaced by the cost of all the links served by base station 112. Based on this assumption, the surplus function, for example, may be shown by:

$$s_i = u_i(\gamma_i) - \rho_i \sum_k \rho_k f_{ik} + p_i \pi_i f_{im}$$

where $f_{ik}$ is path gain from UE of 'i'th link to 'k'th base station and in is the serving base station of link i.

In an aspect, SINR target value of link 'i', for example, may be calculated by:

$$\gamma_{t,i} = g_i\left(\frac{p_i}{\gamma_i}\left(\sum_k \rho_k f_{ik} - \pi_i f_{im}\right)\right)$$

In an aspect, once the price of a base station is calculated, the price may be broadcasted to the neighboring base stations. For example, base station 112 may send its cost values to base stations 114, 116, and/or 118 over inter-base station communication links, for example, X2 interface. However, a X2 interface between base stations may not be always available. For example, a network operator may not configure X2 interfaces between base stations due to cost reasons or the network may comprise of low-powered base stations, for example, femtocells, which are not generally configured with X2 interfaces. In an additional aspect, for example, when power update for UEs is performed by a base station or broadcasted directly to the nearby mobiles, a base station may include price of a base station.

Interference Management Using Re-Selection/Handover Measurements

In an aspect, when the cost of causing interference on base station 'k' by link 'i' is not available, it may be approximated, for example, as shown below:

$$c_{ki} = \rho_j p_i f_{ik}$$
$$= \rho_k p_i \frac{p_{dl,rx,ik}}{p_{dl,tx,k}}$$

where $p_{dl,rx,k}$ is the reference signal received power (RSRP) from base station k at the UE of link i, and $p_{dl,tx,k}$ is the RS transmit power from base station k. In an aspect, for example, assuming that the ratio $$\frac{\rho_k}{p_{dl,tx,k}}$$

is the same for all base stations, the cost may be approximated, for example, as shown below:

$$c_{ki} \approx \rho_m p_i \frac{p_{dl,rx,ik}}{p_{dl,tx,m}}$$

where m is the serving base station of link i.

And a soft target SINR may be calculated, for example, as shown below:

$$\gamma_{t,i} = g_i\left(\frac{p_i}{\gamma_i}\left(\sum_k \rho_k f_{ik} - \pi_i f_{im}\right)\right)$$

$$\approx g_i\left(\frac{p_i}{\gamma_i}\left(\frac{\rho_m}{p_{dl,tx,m}}\sum_k p_{dl,rx,ik} - \pi_i \frac{p_{dl,rx,im}}{p_{dl,tx,m}}\right)\right)$$

In an aspect, as shown above, the dependence on other base stations is limited to the cell selection/handover measurements $p_{dl,rx,ik}$, for example, RSRP of base station k at link i. In an additional aspect, interference target values may be estimated, for example, as shown below:

If $P_i$ denotes the transmit power of base station k, the RSSI at UE i may be calculated, for example, as shown below:

$$\sum_k P_k f_{ik} + n_i = RSSI_i$$

where $n_i$ is the downlink receiver noise at i th link.

In an aspect, for example, assuming that uplink prices are proportional to downlink transmit powers:

$$P_m \sum_k \frac{P_k}{P_m} f_{ik} = (RSSI_i - n_i)$$

$$P_m \sum_k \frac{\rho_k}{\rho_m} f_{ik} = (RSSI_i - n_i)$$

$$\sum_k \rho_k f_{ik} = (RSSI_i - n_i)\frac{\rho_m}{P_m}$$

where m is the serving base station of link i.

From the above, the target SINR value may be estimated, for example, as shown below:

$$\gamma_{t,i} = g_i\left(\frac{p_i}{\gamma_i}\left(\sum_k \rho_k f_{ik} - \pi_i f_{im}\right)\right)$$

$$\approx g_i\left(\frac{p_i}{\gamma_i}\left((RSSI_i - n_i)\frac{\rho_m}{P_m} - \pi_i \frac{p_{dl,rx,im}}{p_{dl,tx,m}}\right)\right)$$

As shown above, interference target values may be estimated from cell selection/handover measurements, for example, RSSI_i and RSRP (p(dl,rx,im)).

In an additional aspect, if the receiver noise is not known at the base station, a conservative value may be estimated based on sensitivity requirements of UE receivers.

In an additional aspect, the pricing based interference management procedure described above may be extended to multi-channel scenarios as well. For example, the procedure described above with reference to system 100 may be run on every channel/sub-band and may require estimating price of each of the channels. In an additional or optional aspect, in the absence of price information per channel/sub-band, a wideband price may be used to estimate the prices of sub-bands by scaling the wideband price with the fractional channel/sub-band size with respect to the full band.

Long Term Evolution Radio Access Technology (LTE)

In an aspect, an overload indicator (OI) and RSRP measurements may be used to calculate interference target value in a LTE network. For example, a OI value may be defined as a price of a link normalized by the transmit power of a reference signal, for example, as shown below:

$$\zeta_i = \frac{\pi_i}{RSTP_m} = \frac{\partial u_i}{\partial \gamma_i} \frac{\gamma_i^2}{p_i RSRP_{im}}$$

where m is the serving base station of link i, $RSTP_m$ is the Reference Signal Transmit power from base station in and $RSRP_{im}$ is the Reference Signal Received Power from base station m at the UE on link i.

In an aspect, for a base station k, for example:

$$\omega_k = \sum_{k \text{ is serving base station of link } i} \zeta_i$$

In an aspect, for example, based on the above, target SINR value for a base station using an OI value may be shown, for example, as below:

$$\gamma_{t,i} = g_i\left(\frac{p_i}{\gamma_i}\left(\sum_k \omega_k RSRP_{ik} - \zeta_i RSRP_{im}\right)\right)$$

In an example aspect, the above formula assumes wideband OI and pricing. In an additional aspect, the definition may be extended to sub-band OI and price per sub-band as described above. In an additional or optional aspect, when OI information is not available, for example, in the case of femto cells where there is no X2 interface, the estimation mechanism described above may be used.

High Speed Uplink Packet Access (HSUPA) Radio Access Technology

In an aspect, for example, in a HSUPA network, the HSUPA measurements may be used to calculate interference target value. For example, relative grant (RG) values may be transmitted by base stations in an active set (AS) of a UE which may be considered as a negative of change in price. In an additional aspect, received signal code power (RSCP) of common pilot channel (CPICH) may be used in path gain approximation.

In an aspect, for example, in HSUPA, a UE which is in soft handoff may receive relative grants from all the base stations in an active set (AS) of a UE. Based on the present disclosure, the relative grants at the base stations may be computed in addition to the UE responses to the absolute and relative grants received from the base stations.

In an aspect, for example, a base station may compute its price increase and if it is greater than a threshold (for example, 1 dB), the base station may transmit a relative grant indicating a UE in soft handoff to reduce its power. The UEs may compute a weighted relative grant based on the path gains to base stations in AS. If this exceeds a threshold (again usually 1 dB) the UE will increase its current maximum allowed grant. If the ratio is less than a threshold (1 dB), the UE will reduce its current maximum allowed grant. In an aspect, when a UE is not in soft handoff, the approximate algorithm mentioned in the previous section may be used.

Figure 2:
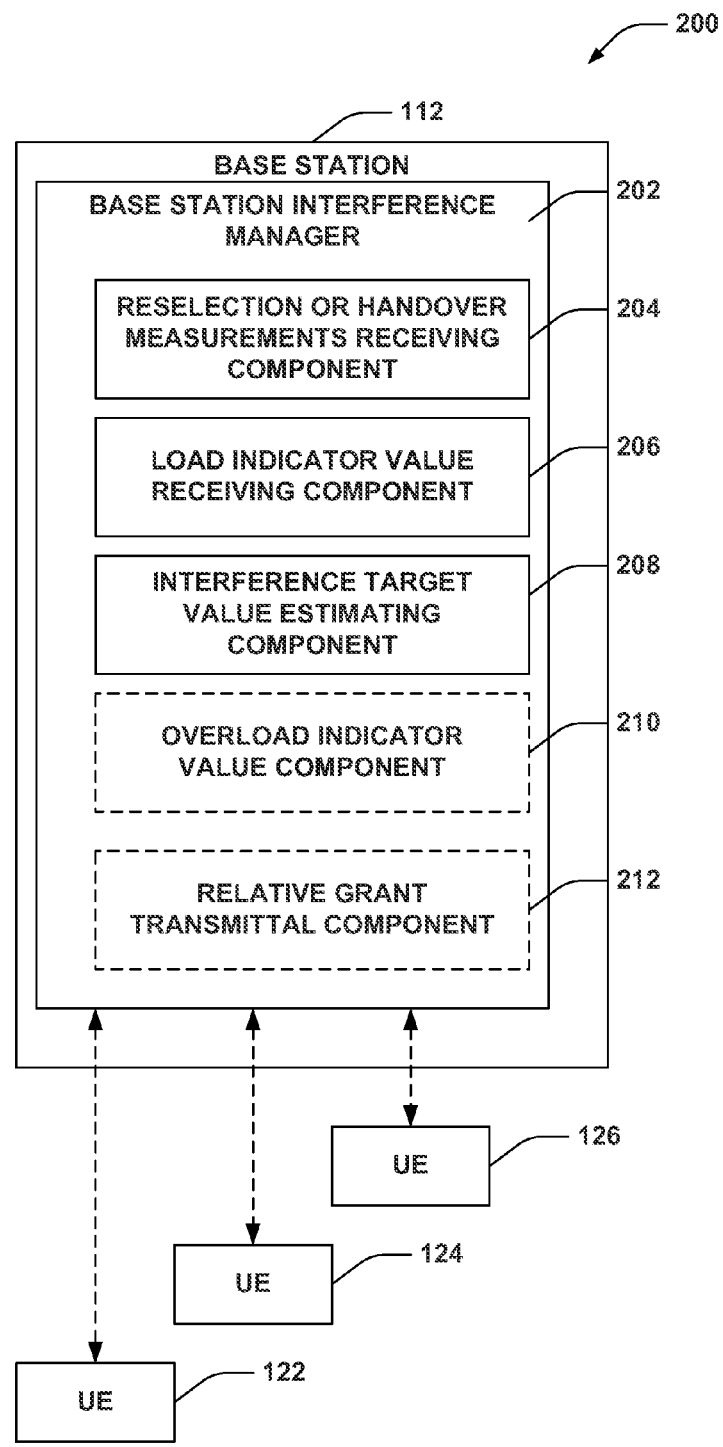
FIG. 2 is a block diagram of an example base station interference manager in aspects of the present disclosure.

FIG. 2 illustrates an aspect of a base station that may be configured to include a base station interference manager for managing uplink (UL) interference at a base station. In an aspect, for example, base station 112 may be configured to include a base station interference manager 202 for managing uplink (UL) interference at base station 112.

In an aspect, base station interference manager 202 may include a reselection or handover measurements receiving component 204, which may be configured to receive one or more reselection or handover measurements from one or more user equipments (UEs) in communication with the base station. For example, reselection or handover measurements receiving component 204 of base station 112 may receive measurements or measurement reports from one or more UEs 122, 124, and/or 126. The measurements or measurement reports received from the UEs may be associated with reselection or handover measurements.

In an aspect, base station interference manager 202 may include a load indicator value receiving component 206, which may be configured to receiving one or more load indicator values from one or more neighboring base stations of the base station. For example, in an aspect, indicator value receiving component 206 may receive one or more load indicator value from one or more neighboring base stations, for example, 114, 116, and/or 118.

In an aspect, base station interference manager 202 may include interference management target value estimating component 208, which may be configured to estimate an interference target value for the one or more UEs in communication with the base station based at least on the measurements received from the one or more UEs and the load indicator values received from the one or more neighboring base stations. For example, in an aspect, interference target value estimating component 208 may process the measurements or measurement reports received from UEs 122, 124, and/or 126 and estimate the interference target value for UE 122.

In an additional aspect, base station interference manager 202 may optionally include an overload indicator value component 210, which may be configured to calculate the interference target value using an overload indicator (OI) value. In an example aspect, the OI value may be computed using the price of links normalized by a transmit power of a reference signal of a base station of the link.

In an additional aspect, base station interference manager 202 may optionally include a relative grant transmittal component 212 which may be configured to transmit relative grants to the one or more UEs in communication with the base station. In an example aspect, a base station may compute the relative grants based on changes in total cost of all the links communicating with the base station, wherein the UEs use the relative grants to compute weighted relative grant based on path gains to the base stations in the AS, and wherein the UEs increase their current grant if the weighted relative grant exceeds a threshold.

Figure 3:
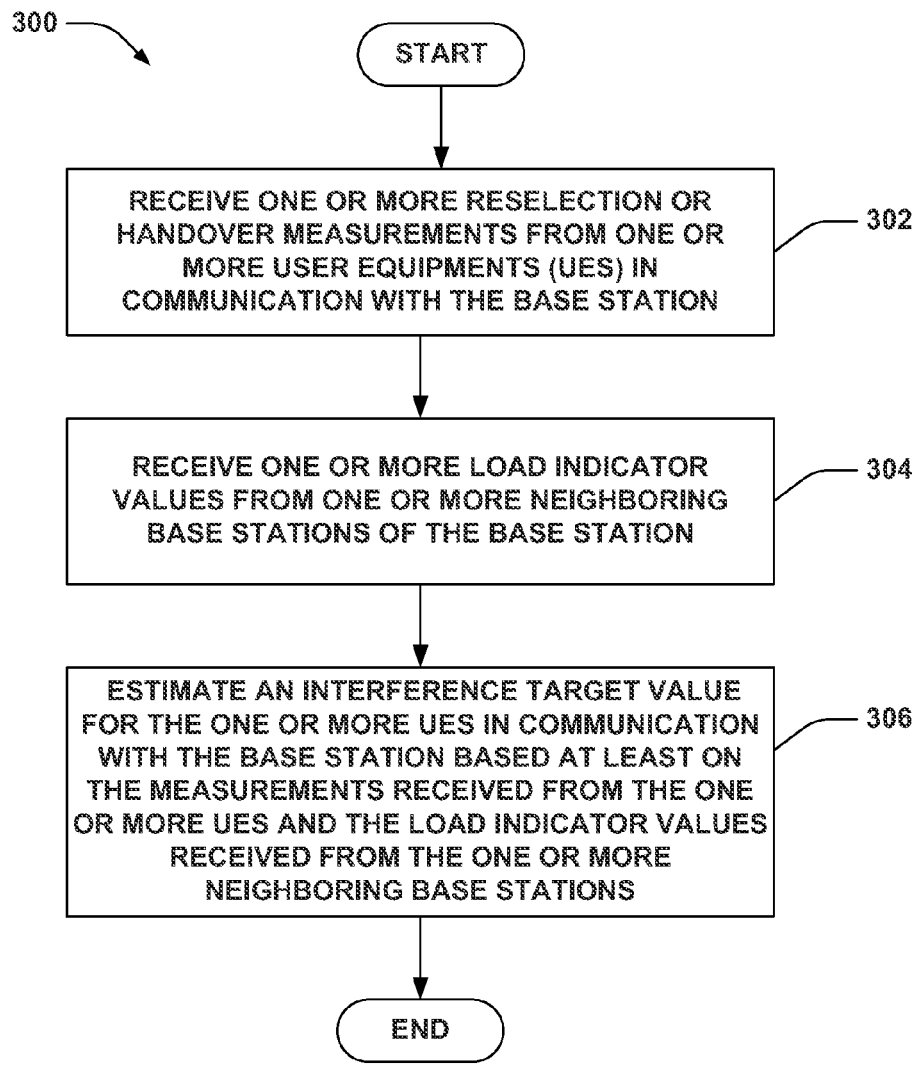
FIG. 3 is a flow diagram illustrating aspects of a method for managing uplink interference at a base station.

FIG. 3 illustrates an example methodology 300 for managing uplink interference at a base station. For example, in an aspect, base station interference manager 202 may manage uplink interference at base station 112.

At block 302, methodology 300 may include receiving one or more reselection or handover measurements from one or more user equipments (UEs) in communication with the base station. For example, base station interference manager 202 and/or reselection or handover measurements receiving component 204 may be configured to receive reselection or handover measurements from one or more UEs, for example, UEs 122, 124, and/or 126.

Further, at block 304, methodology 300 may include receiving one or more load indicator values from one or more neighboring base stations of the base station. For example, base station interference manager 202 and/or load indicator value receiving component 206 may be configured to receive load indicator values from one or more neighboring base stations, for example, from base stations 114, 116, and/or 118.

Further, at block 306, methodology 300 may include estimating an interference target value for the one or more UEs in communication with the base station based at least on the measurements received from the one or more UEs and the load indicator values received from the one or more neighboring base stations. For example, in an aspect, base station interference manager 202 and/or interference target value estimating component 208 may be configured to estimate interference target value for the one or more UEs, for example, 122, 124, and/or 126 in communication with base station 112 based at least on the measurements received from the one or more UEs and the load indicator values received from the one or more neighboring base stations, for example, 114, 116, and/or 118.

The methodology 300 is shown and described as a series of acts, it is to be understood and appreciated that the methodologies are not limited by the order of acts, as some acts may, in accordance with one or more aspects, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more aspects.

Figure 4:
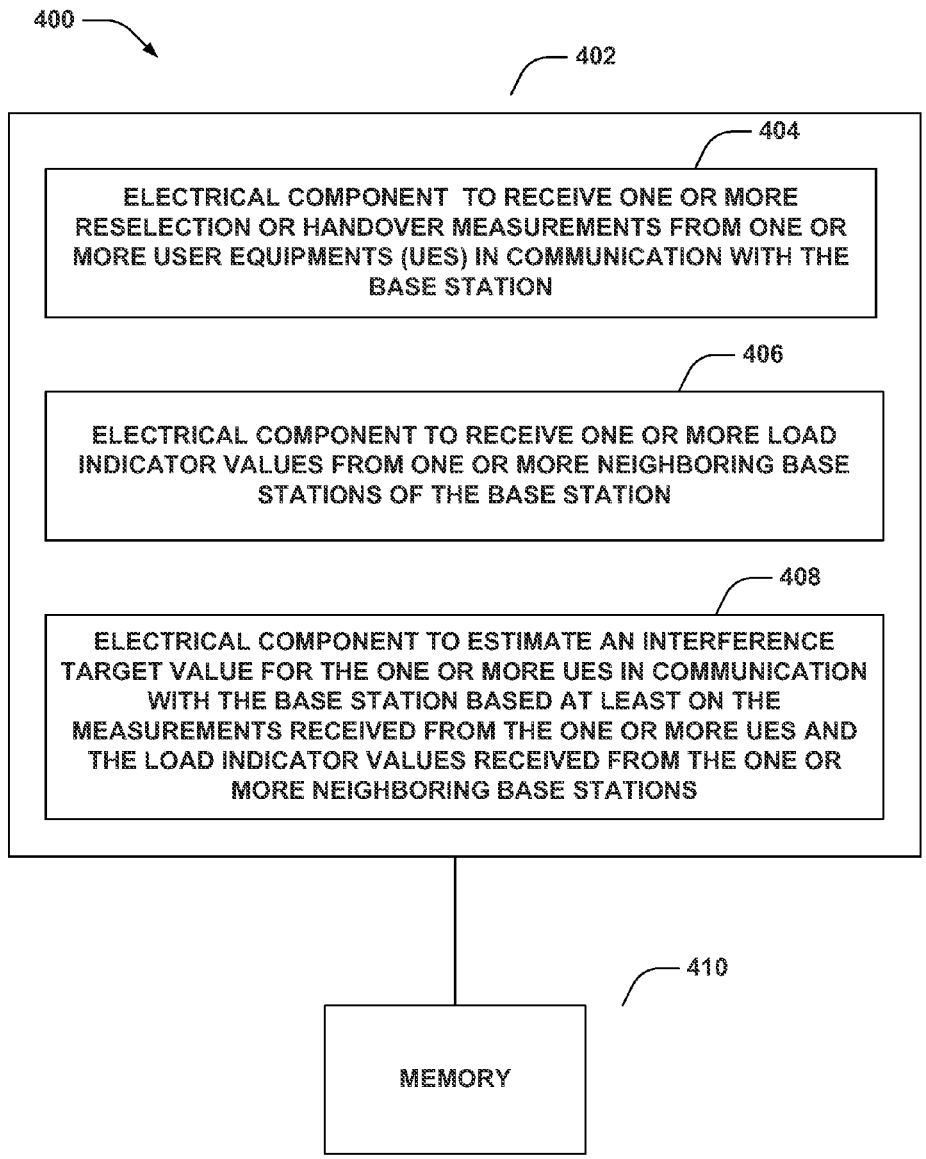
FIG. 4 is a block diagram illustrating aspects of a logical grouping of electrical components for managing uplink interference at a base station.

Referring to FIG. 4, an example system 400 is displayed for managing uplink interference at a base station. For example, system 400 can reside partially within base station 112 and/or base station interference manager 202, (FIGS. 1-2). It is to be appreciated that system 400 is represented as including functional blocks, which can be functional blocks that represent functions implemented by a processor, software, or a combination thereof (for example, firmware). System 400 includes a logical grouping 402 of electrical components that can act in conjunction. For instance, logical grouping 402 can include an electrical component 404 for receiving one or more measurements associated with reselection or handover from one or more user equipments (UEs) in communication with the base station. In an aspect, for example, electrical component 404 may comprise base station interference manager 202 and/or measurements receiving component 204.

Additionally, logical grouping 402 can include an electrical component 406 for estimating an interference target value for the one or more UEs in communication with the base station based at least on the measurements received from the one or more UEs. In an aspect, for example, electrical component 406 may comprise base station interference manager 202 and/or interference target value estimating component 206.

Further, logical grouping 402 can include an electrical component 408 for determining whether the identified symbol file is to be transmitted to a central symbol server. In an aspect, for example, electrical component 408 may comprise symbol file transmitting detecting component 212.

Additionally, system 400 can include a memory 408 that retains instructions for executing functions associated with electrical components 404 and 406. While shown as being external to memory 408, it is to be understood that one or more of the electrical components 404 and 406 can exist within memory 408. In one example, electrical components 404 and 406 can include at least one processor, or each electrical component 404 and 406 can be a corresponding module of at least one processor. Moreover, in an additional or alternative example, electrical components 404 and 406 can be a computer program product comprising a computer readable medium, where each electrical component 404 and 406 can be corresponding code.

Figure 5:
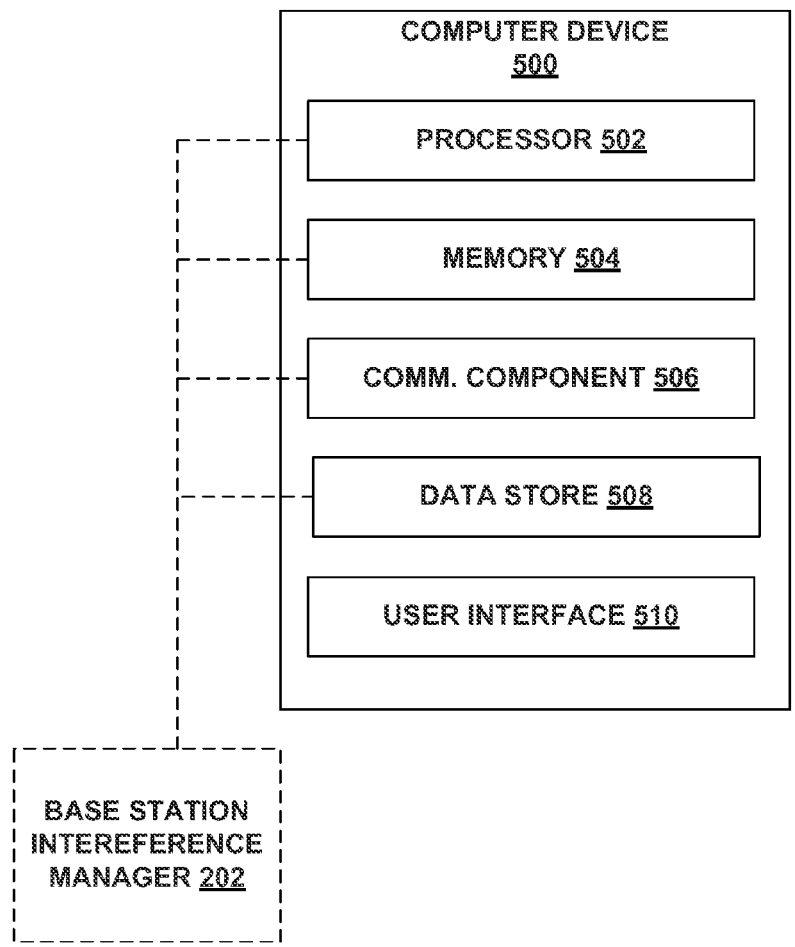
FIG. 5 is a block diagram illustrating aspects of a computer device according to the present disclosure.

Referring to FIG. 5, an aspect of a computer device 500 may be specially programmed or configured to perform the respective functions described herein of any one of the various components of base station interference manager 202. For example, in one aspect, computer device 500 may include base station interference manager 202, reselection or handover measurements receiving component 204, load indicator value receiving component 206, and/or interference target value estimating component 208 as shown in FIG. 2. In an additional or optional aspect, base station interference manager 202 may be configured to further include overload indicator value component 210 and/or relative grant transmittal component 212.

Computer device 500 includes a processor 502 for carrying out processing functions associated with one or more of components and functions described herein. Processor 502 can include a single or multiple set of processors or multi-core processors. Moreover, processor 502 can be implemented as an integrated processing system and/or a distributed processing system. For example, processor 502 may be configured to execute the described functions of base station interference manager 202, measurements receiving component 204, interference target value estimating component 206, and/or overload indicator value component 208, and/or relative grant transmittal component 25.

Computer device 500 further includes a memory 504, such as for storing data used herein and/or local versions of applications and/or instructions or code being executed by processor 502, such as to perform the respective functions of the respective entities described herein. Memory 504 can include any type of memory usable by a computer, such as random access memory (RAM), read only memory (ROM), tapes, magnetic discs, optical discs, volatile memory, non-volatile memory, and any combination thereof. For example, memory 504 may be configured to store measurements associated with reselection or handover and/or interference target values as described herein with respect to memory 504 of base station interference manager 202.

Further, computer device 500 includes a communications component 506 that provides for establishing and maintaining communications with one or more parties utilizing hardware, software, and services as described herein. Communications component 506 may carry communications between components on computer device 500, as well as between computer device 500 and external devices, such as devices located across a communications network and/or devices serially or locally connected to computer device 500. For example, communications component 506 may include one or more buses, and may further include transmit chain components and receive chain components associated with a transmitter and receiver, respectively, or a transceiver, operable for interfacing with external devices. In an additional aspect, communications component 506 may be configured to receive one or more pages from one or more subscriber networks. In a further aspect, such a page may correspond to the second subscription and may be received via the first technology type communication services. For example, communications component 506 may be configured to perform the communications functions described herein of base station interference manager 202.

Additionally, computer device 500 may further include a data store 508, which can be any suitable combination of hardware and/or software, that provides for mass storage of information, databases, and programs employed in connection with aspects described herein. For example, data store 508 may be a data repository for applications not currently being executed by processor 502 and/or any threshold values or finger position values. For example, data store 508 may be configured to store measurements reports associated with reselection or handover and/or interference target value associated with symbol files and database information associated with base station interference manager 202.

Computer device 500 may additionally include a user interface component 55 operable to receive inputs from a user of computer device 500, and further operable to generate outputs for presentation to the user. User interface component 510 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof. For example, user interface component 510 may be configured to receive user input from base station interference manager 202.

Figure 6:
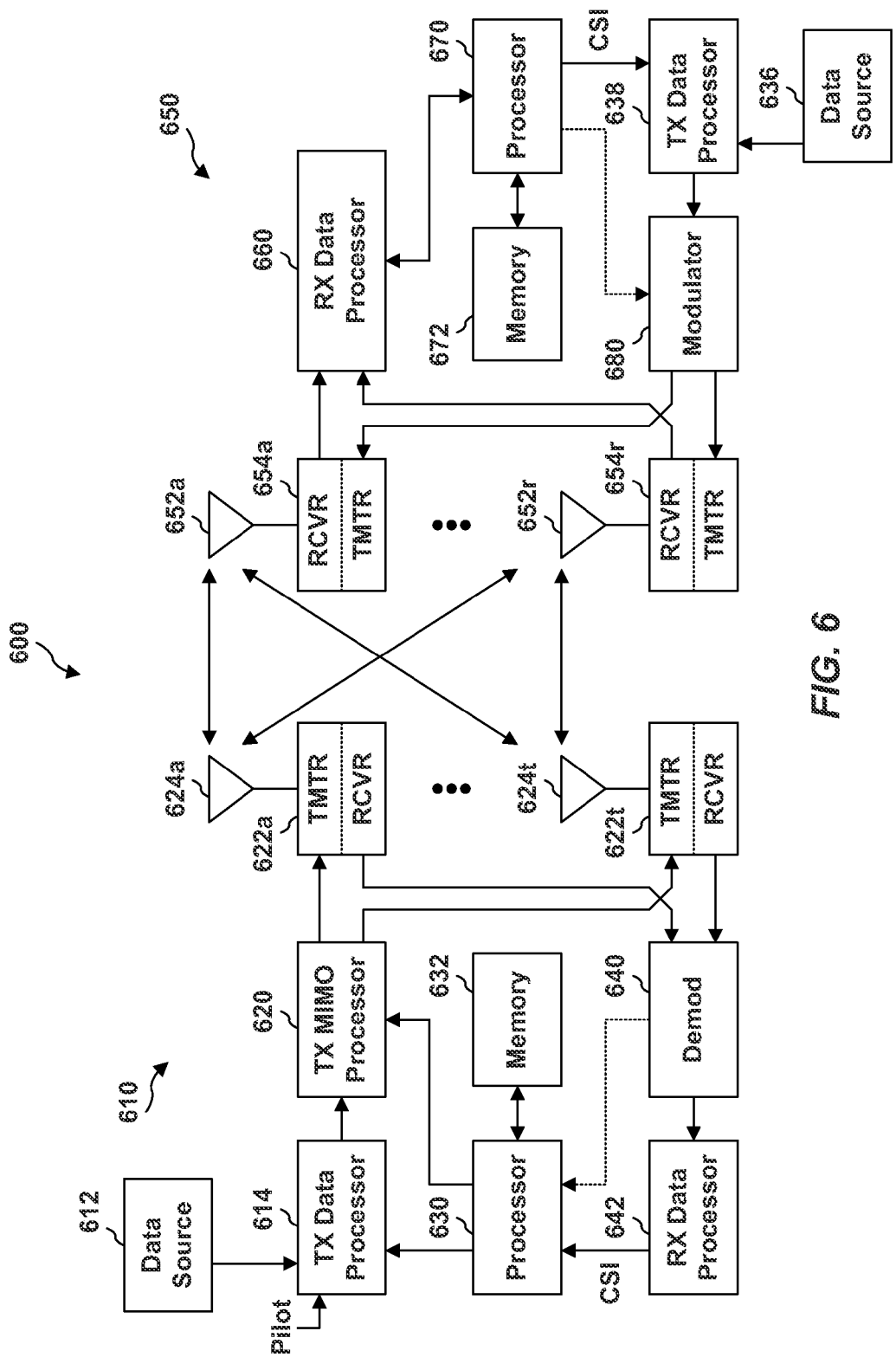
FIG. 6 is a schematic block diagram of an aspect of a wireless network environment that can be employed in conjunction with the various systems and methods described herein.

FIG. 6 shows an example wireless communication system 600. The wireless communication system 600 depicts a base station 610 and one mobile device 650 for sake of brevity. However, it is to be appreciated that system 600 can include more than one base station and/or more than one mobile device, wherein additional base stations and/or mobile devices can be substantially similar or different from example base station 610 and mobile device 650 described below. In an aspect, base station 610 can be base station 112, 14, 116, and/or 118, and mobile device can be UE 122, 124, and/or 126. Moreover, base station 610 can be a low power base station, in one example, such as one or more femtocells previously described. In addition, it is to be appreciated that base station 610 and/or mobile device 650 can employ the example systems and methods (FIGS. 1-5) described herein to facilitate wireless communication there between. For example, components or functions of the systems and/or methods described herein can be part of a memory 632 and/or 662 or processors 630 and/or 660 described below, and/or can be executed by processors 630 and/or 660 to perform the disclosed functions.

At base station 610, traffic data for a number of data streams is provided from a data source 612 to a transmit (TX) data processor 614. According to an example, each data stream can be transmitted over a respective antenna. TX data processor 614 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 650 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The rate, coding, and modulation for each data stream can be determined by instructions performed or provided by processor 630.

The modulation symbols for the data streams can be provided to a TX MIMO processor 620, which can farther process the modulation symbols (e.g., for OFDM). TX MIMO processor 620 then provides $N_T$ modulation symbol streams to $N_T$ transmitters (TMTR) 622a through 622t. In various embodiments, TX MIMO processor 620 applies beamforming weights to the symbols of the data streams and to the antenna from which the symbol is being transmitted.

Each transmitter 622 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 622a through 622t are transmitted from $N_T$ antennas 624a through 624t, respectively.

At mobile device 650, the transmitted modulated signals are received by $N_R$ antennas 652a through 652r and the received signal from each antenna 652 is provided to a respective receiver (RCVR) 654a through 654r. Each receiver 654 conditions (e.g., filters, amplifies, and down converts) a respective signal, digitizes the conditioned signal to provide samples, and further processes the samples to provide a corresponding "received" symbol stream.

An RX data processor 660 can receive and process the $N_R$ received symbol streams from $N_R$ receivers 654 based on a particular receiver processing technique to provide $N_T$ "detected" symbol streams. RX data processor 660 can demodulate, de-interleave, and decode each detected symbol stream to recover the traffic data for the data stream. The processing by RX data processor 660 is complementary to that performed by TX MIMO processor 620 and TX data processor 614 at base station 610.

The reverse link message can comprise various types of information regarding the communication link and/or the received data stream. The reverse link message can be processed by a TX data processor 638, which also receives traffic data for a number of data streams from a data source 636, modulated by a modulator 680, conditioned by transmitters 654a through 654r, and transmitted back to base station 610.

At base station 610, the modulated signals from mobile device 650 are received by antennas 624, conditioned by receivers 622, demodulated by a demodulator 640, and processed by a RX data processor 642 to extract the reverse link message transmitted by mobile device 650. Further, processor 630 can process the extracted message to determine which pre-coding matrix to use for determining the beamforming weights.

Processors 630 and 660 can direct (e.g., control, coordinate, manage, etc.) operation at base station 610 and mobile device 650, respectively. Respective processors 630 and 660 can be associated with memory 632 and 662 that store program codes and data. For example, processor 630 and/or 660 can execute, and/or memory 632 and/or 662 can store instructions related to functions and/or components described herein, such as measuring signals or aspects thereof, determining whether to adjust UL rates, and/or the like, as described.

Figure 7:
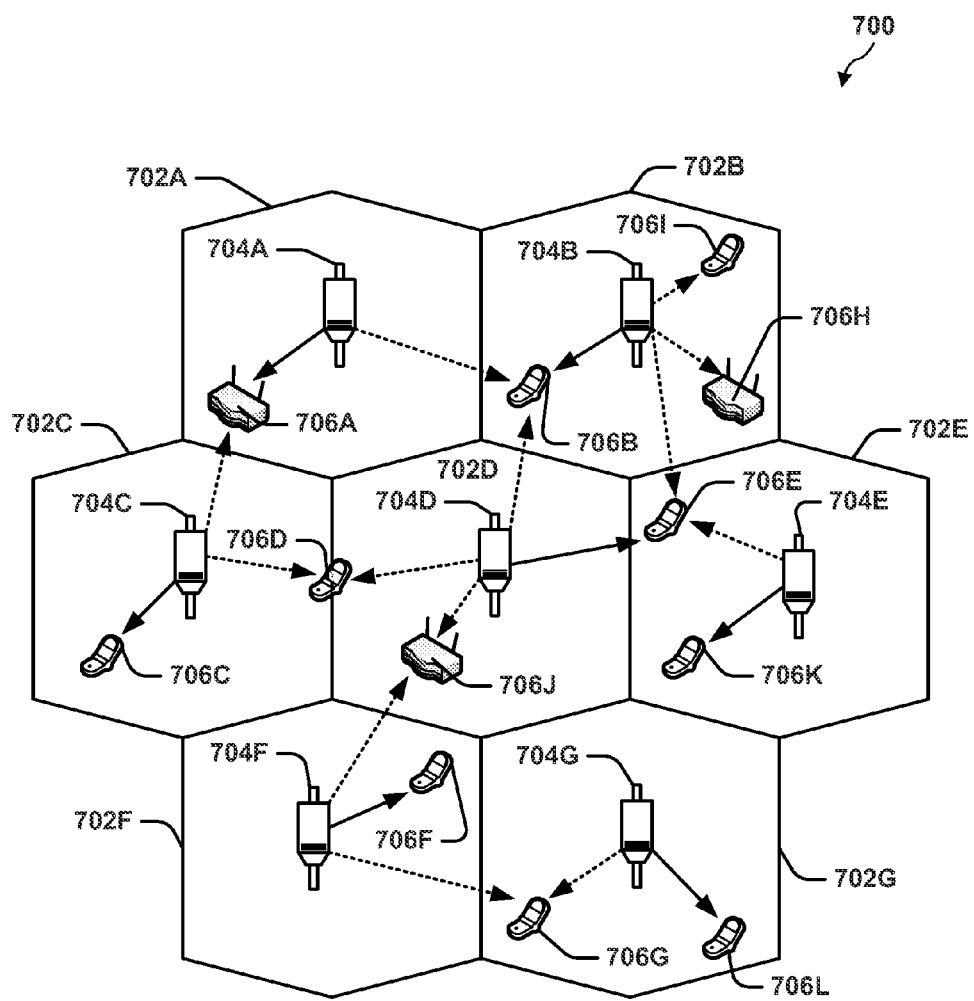
FIG. 7 is a schematic block diagram of an aspect of a wireless network environment that can be employed in conjunction with the various systems and methods described herein.

FIG. 7 illustrates a wireless communication system 700, configured to support a number of users, in which the teachings herein may be implemented. The system 700 provides communication for multiple cells 702, for example, 702A-702G, with each cell being serviced by a corresponding access node 704 (for example, access nodes 704A-704G). In an aspect, cell 702 can be base station, 112, 114, 116, and/or 118 (FIG. 1). As shown in FIG. 7, access terminals 706 (e.g., access terminals 706A-706L) can be dispersed at various locations throughout the system over time. In an aspect, access terminals 706 can be UE 122, 124, and/or 126 (FIG. 1). Each access terminal 706 can communicate with one or more access nodes 704 on a forward link (FL) and/or a reverse link (RL) at a given moment, depending upon whether the access terminal 706 is active and whether it is in soft handoff, for example. The wireless communication system 700 can provide service over a large geographic region.

Figure 8:
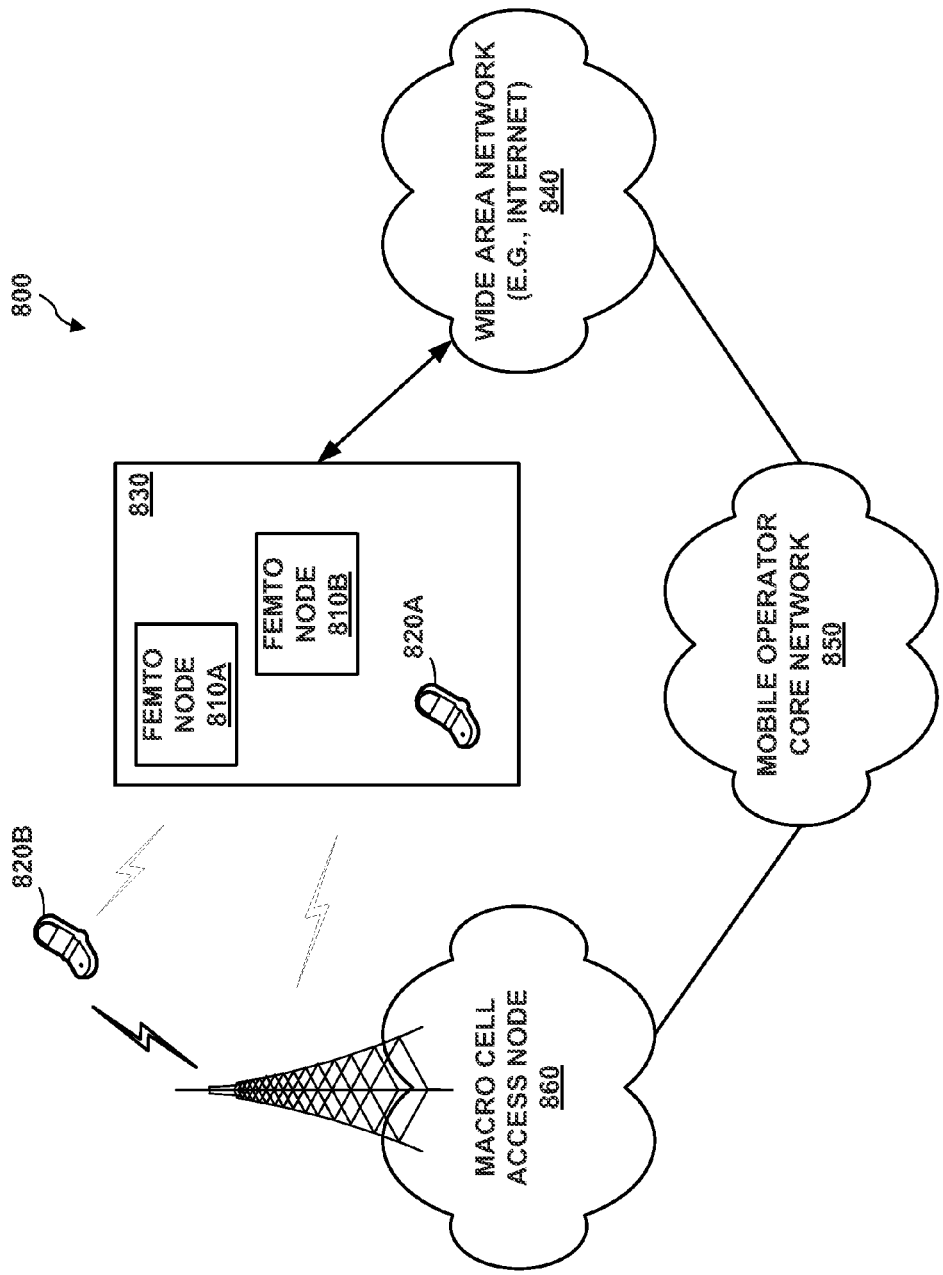
FIG. 8 illustrates an example wireless communication system, configured to support a number of devices, in which the aspects herein can be implemented.

FIG. 8 illustrates an exemplary communication system 800 where one or more base stations, for example, 112, 114, 116, and/or 118 may be deployed within a network environment. In an example aspect, system 800 can include multiple lower power base stations, for example, femto nodes, 810A and 810B. Each node 810 can be coupled to a wide area network 840 (e.g., the Internet) and a mobile operator core network 850 via a digital subscriber line (DSL) router, a cable modem, a wireless link, or other connectivity means (not shown). As will be discussed below, each femto node 810 can be configured to serve associated access terminals 820 (e.g., access terminal 820A) and, optionally, alien access terminals 820 (e.g., access terminal 820B). In other words, access to femto nodes 810 can be restricted such that a given access terminal 820 can be served by a set of designated (e.g., home) femto node(s) 810 but may not be served by any non-designated femto nodes 810 (e.g., a neighbor's femto node).

Figure 9:
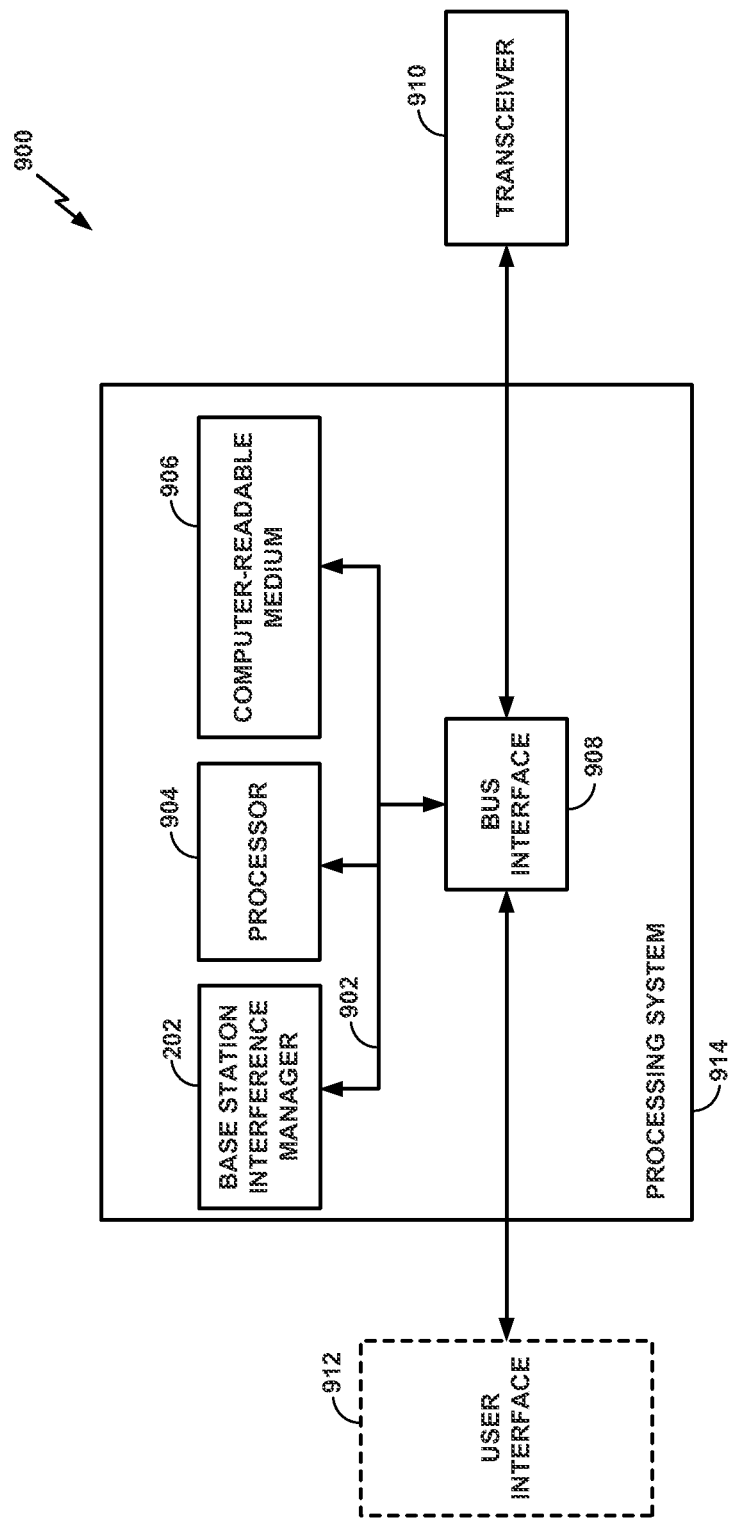
FIG. 9 is block diagram illustrating an example of a hardware implementation for an apparatus employing a processing system.

FIG. 9 is a block diagram illustrating an example of a hardware implementation for an apparatus 900 employing a processing system 914 for carrying out aspects of the present disclosure, such as methods for managing uplink interference at base station. In this example, processing system 914 may be implemented with a bus architecture, represented generally by bus 902. The bus 902 may include any number of interconnecting buses and bridges depending on the specific application of the processing system 914 and the overall design constraints. The bus 902 links together various circuits including one or more processors, represented generally by the processor 904, computer-readable media, represented generally by the computer-readable medium 906, and one or more components described herein, such as, but not limited to, base station 112, base station interference manager 202, reselection or handover measurements receiving component 204, load indicator value receiving component 206, and/or interference target value estimating component 208 (FIG. 2).

The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a means for communicating with various other apparatus over a transmission medium. Depending upon the nature of the apparatus, a user interface 912 (e.g., keypad, display, speaker, microphone, joystick) may also be provided.

The processor 904 is responsible for managing the bus 902 and general processing, including the execution of software stored on the computer-readable medium 909. The software, when executed by the processor 904, causes the processing system 914 to perform the various functions described infra for any particular apparatus. The computer-readable medium 909 may also be used for storing data that is manipulated by the processor 904 when executing software.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or," That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc., and/or may not include all of the devices, components, modules etc., discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. A storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined, by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

For convenience, the disclosure herein describes functionality in the context of a femtocell. It should be appreciated, however, that a macro cell or a pico cell or any type of base station equipment can provide the same or similar functionality as a femtocell, but for a larger/smaller coverage area.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined, by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for managing uplink (UL) interference at a base station, comprising:
   receiving one or more reselection or handover measurements from one or more user equipments (UEs) in communication with the base station;
   receiving one or more load indicator values from one or more neighboring base stations of the base station; and
   estimating an interference target value for the one or more UEs in communication with the base station based at least on the measurements received from the one or more UEs and the load indicator values received from the one or more neighboring base stations, wherein the estimating includes:
      computing a total cost of links from all base stations to a respective UE of the one or more UEs, wherein the total cost is computed based on interference caused by the respective UE on the one or more neighboring base stations which receive non-zero signals from the respective UE and the load indicator values of the one or more neighboring base stations; and
      deducting a cost of a link from the respective UE to a serving base station of the respective UE.

2. The method of claim 1, wherein the interference target value is a signal to interference plus noise ratio (SINR) target value.

3. The method of claim 2, wherein the base station is a long term evolution (LTE) base station.

4. The method of claim 2, wherein the measurements received at the base station from the one or more UEs include reference signal received power (RSRP) values of the one or more neighboring base stations.

5. The method of claim 4, further comprising:
   utilizing an overload indicator (OI) value of a link to calculate the interference target value of the link, wherein the OI value is a price of a link normalized by a transmit power of a reference signal of the link.

6. The method of claim 2, wherein the base station is a high speed uplink packet access (HSUPA) base station.

7. The method of claim 6, wherein the measurements received at the base station from the one or more UEs include reference signal code power (RSCP) values of the one or more neighboring stations.

8. The method of claim 1, further comprising:
   computing a relative grant for at least one UE of the one or more UEs based on changes in a total cost of all the links communicating with the base station; and
   transmitting the relative grant to the at least one UE, wherein the relative grant is usable by the at least one UE to compute weighted relative grants based on path gains to base stations in an active set (AS) of the at least one UE and to increase a current grant if the weighted relative grants exceed a threshold.

9. An apparatus for managing uplink (UL) interference at a base station, comprising:
   means for receiving one or more reselection or handover measurements from one or more user equipments (UEs) in communication with the base station;
   means for receiving one or more load indicator values from one or more neighboring base stations of the base station; and
   means for estimating an interference target value for the one or more UEs in communication with the base station based at least on the measurements received from the one or more UEs and the load indicator values received from the one or more neighboring base stations, wherein the means for estimating the interference target value includes:
      means for computing a total cost of links from all base stations to a respective UE of the one or more UEs, wherein the total cost is computed based on interference caused by the respective UE on the one or more neighboring base stations which receive non-zero signals from the respective UE and the load indicator values of the one or more neighboring base stations; and means for deducting a cost of a link from the respective UE to a serving base station of the respective UE.

10. The apparatus of claim 9, wherein the interference target value is a signal to interference plus noise ratio (SINR) target value.

11. The apparatus of claim 10, wherein the base station is a long term evolution (LTE) base station.

12. The apparatus of claim 10, wherein the means for receiving the one or more reselection or handover measurements is configured to receive reference signal received power (RSRP) values of the one or more neighboring base stations.

13. The apparatus of claim 12, further comprising:
means for utilizing an overload indicator (OI) value of a link to calculate the interference target value of the link, wherein the OI value is a price of a link normalized by a transmit power of a reference signal of the link.

14. The apparatus of claim 10, wherein the base station is a high speed uplink packet access (HSUPA) base station.

15. The apparatus of claim 14, wherein the means for receiving the one or more reselection or handover measurements is configured to receive reference signal code power (RSCP) values of the one or more neighboring stations.

16. The apparatus of claim 9, further comprising:
means for computing a relative grant of at least one UE of the one or more UEs based on changes in a total cost of all the links communicating with the base station;
means for transmitting the relative grant to the at least one UE, wherein the relative grant is usable by the at least one UE to compute weighted relative grants based on path gains to base stations in an active set (AS) of the at least one UE and to increase a current grant if the weighted relative grants exceed a threshold.

17. A non-transitory computer readable medium storing computer executable code for managing uplink (UL) interference at a base station, comprising:
code for receiving one or more reselection or handover measurements from one or more user equipments (UEs) in communication with the base station;
code for receiving one or more load indicator values from one or more neighboring base stations of the base station; and
code for estimating an interference target value for the one or more UEs in communication with the base station based at least on the measurements received from the one or more UEs and the load indicator values received from the one or more neighboring base stations, wherein the code for estimating the interference target value includes:
code for computing a total cost of links from all base stations to a respective UE of the one or more UEs, wherein the total cost is computed based on interference caused by the respective UE on the one or more neighboring base stations which receive non-zero signals from the respective UE and the load indicator values of the one or more neighboring base stations; and
code for deducting a cost of a link from the respective UE to a serving base station of the respective UE.

18. The computer readable medium of claim 17, wherein the interference target value is a signal to interference plus noise ratio (SINR) target value.

19. The computer readable medium of claim 18, wherein the base station is a long term evolution (LTE) base station.

20. The computer readable medium of claim 18, wherein the code for receiving further comprises code for receiving reference signal received power (RSRP) values of the one or more neighboring base stations.

21. The computer readable medium of claim 20, further comprises code for utilizing an overload indicator (OI) value of a link to calculate the interference target value of the link, wherein the OI value is a price of a link normalized by a transmit power of a reference signal of the link.

22. The computer readable medium of claim 18, wherein the base station is a high speed uplink packet access (HSUPA) base station.

23. The computer readable medium of claim 22, wherein the code for receiving is further configured to include code for receiving reference signal code power (RSCP) values of one or more neighboring stations.

24. The computer readable medium of claim 17, further comprising:
code for computing a relative grant of at least one UE of the one or more UEs based on changes in a total cost of all the links communicating with the base station; and
code for transmitting the relative grant to the at least one UE, wherein the relative grant is usable by the at least one UE to compute weighted relative grants based on path gains to base stations in an active set (AS) of the at least one UE and to increase a current grant if the weighted relative grants exceed a threshold.

25. An apparatus for managing uplink (UL) interference at a base station, comprising:
a reselection or handover measurements receiving component to receive one or more reselection or handover measurements from one or more user equipments (UEs) in communication with the base station;
a load indicator value receiving component to receive one or more load indicator values from one or more neighboring base stations of the base station; and
an interference target value estimating component to estimate an interference target value for the one or more UEs in communication with the base station based at least on the measurements received from the one or more UEs and the load indicator values received from the one or more neighboring base stations, wherein the interference target value estimating component is further configured to:
compute a total cost of links from all base stations to a respective UE of the one or more UEs, wherein the total cost is computed based on interference caused by the respective UE on the one or more neighboring base stations which receive non-zero signals from the respective UE and the load indicator values of the one or more neighboring base stations; and
deduct a cost of a link from the respective UE to a serving base station of the respective UE.

26. The apparatus of claim 25, wherein the interference target value is a signal to interference plus noise ratio (SINR) target value.

27. The apparatus of claim 26, wherein the base station is a long term evolution (LTE) base station.

28. The apparatus of claim 26, wherein the reselection or handover measurements receiving component is further configured to receive reference signal received power (RSRP) values of the one or more neighboring base stations.

29. The apparatus of claim 28, further comprising:
an overload indicator (OI) value component to utilize an overload indicator (OI) value of a link to calculate the interference target value of the link, wherein the OI value is a price of a link normalized by a transmit power of a reference signal of the link.

30. The apparatus of claim 26, wherein the base station is a high speed uplink packet access (HSUPA) base station.

31. The apparatus of claim 30, wherein the reselection or handover measurements receiving component is further configured to receive reference signal code power (RSCP) values of the one or more neighboring stations.

32. The apparatus of claim 25, further comprising:
a relative grant transmittal component configured to transmit a relative grant to at least one UE of the one or more UEs in communication with the base station, wherein the relative grant of the at least one UE is computed based on changes in a total cost of all the links communicating with the base station, wherein the relative grant is usable by the at least one UE to compute weighted relative grants based on path gains to base stations in an active set (AS) of the at least one UE and to increase a current grant if the weighted relative grants exceed a threshold.

* * * * *